US 6,563,988 B2

(12) United States Patent
McGreer

(10) Patent No.: US 6,563,988 B2
(45) Date of Patent: May 13, 2003

(54) OPTICAL APPARATUS AND METHOD HAVING PREDETERMINED GROUP VELOCITY DISPERSION

(75) Inventor: Kenneth McGreer, Fremont, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

(21) Appl. No.: 09/842,491

(22) Filed: Apr. 25, 2001

(65) Prior Publication Data
US 2002/0159703 A1 Oct. 31, 2002

(51) Int. Cl.$^7$ .............. G02B 6/26; G02B 6/42
(52) U.S. Cl. .............. 385/43; 385/37; 385/24; 385/46; 385/28; 385/39; 385/15; 385/14
(58) Field of Search ............... 385/1, 2, 7, 8, 385/14, 37, 15, 24, 43, 46, 27, 28, 31

(56) References Cited

U.S. PATENT DOCUMENTS

| 5,002,350 | A | | 3/1991 | Dragone |
| 5,136,671 | A | | 8/1992 | Dragone |
| 5,179,605 | A | * | 1/1993 | Kaverhad et al. ............ 385/37 |
| 5,412,744 | A | | 5/1995 | Dragone |
| 5,629,992 | A | | 5/1997 | Amersfoort et al. |
| 5,629,999 | A | * | 5/1997 | Henry et al. .................. 385/27 |
| 5,680,236 | A | * | 10/1997 | Van Der Tol ............... 359/116 |
| 5,889,906 | A | | 3/1999 | Chen |
| 6,047,096 | A | | 4/2000 | Augustsson |
| 6,069,990 | A | | 5/2000 | Okawa et al. |
| 6,141,152 | A | * | 10/2000 | Trouchet .................... 359/618 |
| 6,195,481 | B1 | * | 2/2001 | Nakajima et al. ........... 359/115 |
| 6,195,482 | B1 | * | 2/2001 | Dragone ...................... 385/28 |
| 6,233,375 | B1 | * | 5/2001 | Lang et al. .................. 359/326 |
| 2002/0015559 | A1 | * | 2/2002 | Kashihara et al. ............ 385/37 |
| 2002/0057865 | A1 | * | 5/2002 | Katayama .................... 385/24 |

FOREIGN PATENT DOCUMENTS

| EP | 0 702 253 | 3/1996 |
| EP | 0 721 120 | 7/1996 |
| EP | 0 731 367 | 9/1996 |
| EP | 0 881 512 | 12/1998 |
| EP | 1 059 545 | 12/2000 |
| JP | 10-197735 | 10/1998 |
| WO | WO 01/33270 | 5/2001 |

OTHER PUBLICATIONS

Dragone, C. (1998). "Efficient Techniques for Widening the Passband of a Wabelength Router," *J. Lightwave Technol.* 16(10): 1895–1906.

Kogelnik, H. (1988). "Chapter 2: Theory of Optical Waveguides," *Guided–Wave Optoelectonics* pp. 7–87.

McGreer, K. (1998). "Arrayed Waveguide Grating For Wavelength Routing," *IEEE Comminications Magazine* 36(12): 62–68.

(List continued on next page.)

*Primary Examiner*—Hemang Sanghavi
*Assistant Examiner*—Scott A Knauss
(74) *Attorney, Agent, or Firm*—Morrison & Foerster LLP

(57) ABSTRACT

An optical apparatus and method establishes a value of group velocity dispersion in wavelength division multiplexing applications. The optical apparatus includes at least one input waveguide, a first slab waveguide, an arrayed waveguide grating, a second slab waveguide, at least one output waveguide, and at least one transition segment optically connecting the at least one input waveguide to the first slab waveguide. The transition segment features a taper and an extension. The wide end of the taper is optically connected to the first end of the extension and the second end of the extension is optically connected to the slab waveguide and the first and second ends are equal in width. The extension may have a constant or non-constant width and may include a heating element. When a plurality of transition segments are featured, each transition segment may have similar or different properties. The transition segments may be used at the output side of the optical apparatus as well as at the input side.

41 Claims, 10 Drawing Sheets

OTHER PUBLICATIONS

Milton, A.F. and Burns, W.K. (1977). "Mode coupling in Optical Waveguide Horns," *IEEE Journal of Quantum Electronics* QE-13(10): 828–835.

Nishihara, H. et al., (1987). "2.4.2: Approximate Analyses of Guided Modes," *Optical Integrated Circuits* p. 29.

Okamoto, K. (2000). *Fundementals of Optical Waveguides* pp. 346–381, Academic Press, San Diego, CA, USA.

Okamoto, K. and Sugita, A. (1996). "Flat Spectral Response Array—Waveguide Grating Multiplexer with Parabolic Waveguide Horns," *Electronics Letters* 32(18): 1661–1662.

Okamoto, K. and Yamada, H. (1995). "Arrayed–Waveguide Grating Multiplexer with Flat spectral Response," *Optical Letters*, 20(1): 43–45.

Smit, M.K. and Van Dam, C. (1996). "PHASAR–Based WDM–Devices: Principles, Design, and Application," *IEEE Journal of Selected Topics in Quantum Electronics* 2(2): 236–250.

Soldano, L.B. et al., (1992). "Planar Monomode Optical Couplers Based on Multimode Interference Effects," *Journal of Lightwave Technology* 10(12): 1843–1850.

Soole, J.B.D. et al., (1996). "Use of Multimode Interference Couplers to Broaden the Passband of Wavelength–Dispersive Integrated WDM Filters," *IEEE Photonics Technology Letters* 38(10): 1340–1342.

Yamada, H. et al., (2000). "Dispersion Resulting From Phase and Amplitude Errors in Arrayed–Waveguide Grating Multiplexers–Demultiplexers," *Optics Letters* 25(8): 569–571.

* cited by examiner-

OPTICAL APPARATUS AND METHOD HAVING PREDETERMINED GROUP VELOCITY DISPERSION

FIELD OF THE INVENTION

This invention is directed to an apparatus and method which is useful in wavelength division multiplexing systems. More particularly, this invention is directed to an optical apparatus having a predetermined group velocity dispersion of signals.

BACKGROUND

Wavelength division multiplexing (WDM) is a technique for increasing transmission capacity in fiber optic communication systems. To this end, a number of optical devices have been researched and developed including optical routers.

A typical optical router has at least one input port and at least one output port. Light associated with an optical signal is coupled from an input port to an output port according to the carrier wavelength of the optical signal. Examples of optical routers include multiplexers, demultiplexers, and N×N optical routers.

A number of problems, however, must be overcome whenever a WDM system is used for high data rate transmission. These problems include group-velocity dispersion (GVD) and differential group delay (DGD).

GVD is one problem that arises when data rates are increased in a WDM system. If the magnitude of the group-velocity dispersion of the system is sufficiently large, the optical pulses that are transmitted as adjacent pulses will be received as pulses that overlap to a significant extent. The overlapping of adjacent pulses increases the bit error rate of the system and consequently degrades the performance of the fiber optic system. In order to prevent this performance degradation, typically all components of the system are required to have a value of group-velocity dispersion within a certain tolerance. The tolerance limits become smaller as the data rate increases for a particular application. For high bit rate applications the optical router is commonly required to have a value of group-velocity dispersion that is low or sufficiently close to zero throughout the band associated with each wavelength channel. The optical router must have a low value of the absolute value of the group-velocity dispersion within a substantial portion of the passband of each channel.

Differential group delay (DGD) is another problem that must be overcome when data rates are increased in a WDM system. DGD is the group delay for the polarization state that provides that largest group delay minus the group delay for the polarization state that provides the lowest group delay. In order to prevent a fiber optical transmission system from being degraded by polarization mode dispersion, each of the components must have sufficiently low DGD. In general, DGD is positively correlated with GVD. Therefore, ensuring that GVD is low typically ensures that DGD is low.

One technique for fabricating an optical wavelength router is planar lightwave circuit (PLC) technology. A typical PLC comprises planar waveguides and/or channel waveguides. Examples of planar and channel waveguides are shown in H. Kogelnik, *Theory of Optical Waveguides*, Guided-Wave Optoelectonics T. Tamir ed., Springer-Verlag, Berlin, 1988, and also by H. Nishihara, M. Haruna, and T. Suhara, *Optical Integrated Circuits*, McGraw Hill, New York, 1987.

In a planar (or slab) waveguide, light is generally restricted to propagate in a region that is thin (typically between 3 $\mu$m and 30 $\mu$m) in one dimension, referred to herein as the lateral dimension or height, and extended (typically between 1 mm and 100 mm) in the other two dimensions. Herein, we refer to the plane that is perpendicular to the lateral dimension of the PLC as the plane of the PLC. The longitudinal direction is defined to be the direction of propagation of light at any point on the PLC. Further, the lateral direction is defined to be perpendicular to the plane of the PLC and the transverse direction is defined to be perpendicular to both the longitudinal and the lateral directions.

In a channel waveguide, light has an optical field that is substantially confined in both the lateral direction and the transverse direction. In a typical channel waveguide, the field is substantially confined within a region that extends between 3 $\mu$m and 30 $\mu$m in the lateral direction, herein referred to as the height, and extends between 3 $\mu$m and 100 $\mu$m in the transverse direction, herein referred to as the width.

Typically, the optical field of light that propagates in a channel waveguide comprises a linear combination of normal modes. The normal modes may be denoted as $E^x_{pq}$ and $E^y_{pq}$, where p and q may be any non-negative integer and x and y are used to denote the polarization of the mode, x referring to the lateral direction and y referring to the transverse direction. See H. Nishihara, M. Haruna, and T. Suhara, *Optical Integrated Circuits*, McGraw Hill, New York, 1987, p. 29. Herein $\phi_i$ refers to either $E^x_{0,i-1}$, or $E^y_{0,i-1}$ or a linear combination of $E^x_{0,i-1}$ and $E^y_{0,i-1}$ as the case may be. That is, $\phi_1$ refers to a mode that has no nodes in either the lateral or the transverse directions and $\phi_3$ refers to a mode that has no nodes in the lateral direction and two nodes in the transverse direction. Herein the $\phi_1$ mode may be referred to as the fundamental mode or, alternatively to the first mode. Herein the $\phi_3$ mode may be referred to as the third mode.

There are various approaches to building a PLC. In a typical example of a PLC, a slab waveguide comprises three layers of silica glass with the core layer lying between the top cladding layer and the bottom cladding layer. Channel waveguides are often formed by at least partially removing (typically with an etching process) core material beyond the transverse limits of the channel waveguide and replacing it with at least one layer of side cladding material that has an index of refraction that is lower than that of the core material. The side cladding material is usually the same material as the top cladding material. Further, each layer may be doped in a manner such that the core layer has a higher index of refraction than either the top cladding or bottom cladding. When layers of silica glass are used for the optical layers, the layers are typically deposited on a silicon wafer. As a second example, slab waveguides and channel waveguides comprise three or more layers of InGaAsP and adjacent layers can have compositions with different percentages of the constituent elements In, P, Ga, and As. As a third example, one or more of the optical layers of the slab waveguide and/or channel waveguide may comprise an optically transparent polymer. A fourth example of a slab waveguide comprises a layer with a graded index such that the region of highest index of refraction is bounded by regions of lower indices of refraction. A doped-silica waveguide is usually preferred because it has a number of attractive properties including low cost, low loss, low birefringence, stability, and compatibility for coupling to fiber.

In addition to the channel and slab waveguides described above, various PLCs may comprise at least one optical dispersive region such as, for example, an arrayed waveguide. An arrayed-waveguide grating router (AWGR) is a planar lightwave circuit and comprises at least one input channel waveguide, an input slab waveguide, an arrayed-waveguide grating (AWG), an output slab waveguide, and at least one output channel waveguide. The edge of the input slab waveguide to which the input waveguides are attached is referred to herein as the input focal curve. The edge of the output slab waveguide to which the output waveguides are attached is referred to herein as the output focal curve.

The arrayed-waveguide grating comprises an array of waveguides. The length of the $i^{th}$ waveguide in the AWG is denoted as $L_i$. The angular dispersion that is provided by the AWG is determined in part by the difference in length between adjacent waveguides, $L_{i+1}-L_i$. The details of construction and operation of the AWGR are described in M. K. Smit and C. Van Dam, *PHASAR-Based WDM-Devices: Principles, Design, and Application,* IEEE Journal of Selected Topics in Quantum Electronics, vol. 2, no. 2, pp. 236–250 (1996); K. McGreer, *Arrayed Waveguide Gratings For Wavelength Routing,* IEEE Communication Magazine, vol. 36, no. 12, pp. 62–68 (1998); and K. Okamoto, *Fundamentals of Optical Waveguides,* pp. 346–381, Academic Press, San Diego, Calif., USA (2000). Each of the publications and patents referred to in this application is herein incorporated by reference in its entirety.

One type of AWGR is a Gaussian-passband AWGR (G-AWGR). In a G-AWGR, the length difference between adjacent waveguides of the AWG, $L_{i+1}-L_i$, is substantially independent of I (i.e., $L_{i+1}-L_i$ is substantially constant throughout the AWG.). This type of AWGR is described in K. Okamoto, *Fundamentals of Optical Waveguides,* pp. 346–360, Academic Press, San Diego, Calif., USA (2000). Herein, the coupling width is defined as the width that the input or output waveguide has at the point where it is attached to its respective slab waveguide. This construction generally results in an AWGR that provides passbands that are approximately Gaussian in shape.

The shape of the passband is determined by the convolution of two fields. The first field in the convolution is the field that is formed from the light that passes through the AWG and is imaged onto the output focal curve. The second field in the convolution is the fundamental mode of the output waveguide at the output focal curve. In the G-AWGR, both fields in the convolution are substantially Gaussian, and, consequently, the passband is substantially Gaussian. In an ideal G-AWGR there is no phase error and no amplitude error and, consequently, the group delay and the GVD are both equal to zero at the center of the passband. See H. Yamada, K. Okamoto, A. Kaneko, and A. Sugita, *Dispersion Resulting From Phase And Amplitude Errors In Arrayed-Waveguide Grating Multiplexers-Demultiplexers,* Optics Letters, vol. 25, no. 8, pp. 569–571 (2000). In practice, however, fabrication errors lead to phase and amplitude errors that may cause a non-zero GVD at the center of the passband.

Another type of AWGR is a passband-flattened AWGR (PF-AWGR). The passband of the PF-AWGR is typically broader than the passband of a G-AWGR. In this context, a passband that is relatively broad refers to a passband having a value of flatness that is relatively large wherein flatness is defined as the −1 dB passband width divided by the −20 dB passband width. Typically, a G-AWGR has a passband flatness of approximately 0.22, and typically a PF-AWGR is required to have a flatness of 0.3 or larger. This is advantageous because many applications require the passband to be broader than can be provided by the G-AWGR.

There are a variety of techniques to broaden the passband of an AWGR. One technique for broadening the passband of an AWGR involves the introduction of an MMI coupler between the slab waveguide and the channel waveguide at either the input side or the output side. See, for example, J. B. D. Soole et al., *Use Of Multimode Interference Couplers To Broaden The Passband Of Wavelength-Dispersive Integrated WDM Filters,* IEEE Photonics Technology Letters, vol. 8, no. 10, pp. 1340–1342 (1996); U.S. Pat. No. 5,629,992 to Amersoot et al; and U.S. Pat. No. 5,412,744 to Dragone. Use of MMI couplers, however, results in excess optical insertion loss.

Another technique for broadening the passband of an AWGR involves the introduction of a "horn" between the slab waveguide and the channel waveguide at either the input side or the output side. Employing a horn instead of the MMI coupler is advantageous because the horn provides a smoother and more adiabatic transition and because its utilization is the most tolerant to variations in the fabrication process. Adiabatic transitions are generally employed because they minimize transition loss.

An example of a PF-AWGR optical router 10 is depicted in FIG. 1A and is similar to that disclosed in K. Okamoto and A. Sugita, *Flat Spectral Response Array-Waveguide Grating Multiplexer With Parabolic Waveguide Horns,* Electronics Letters, vol. 32, no. 18, pp. 1661–1662 (1996). The router 10 includes one or more input waveguides 20, an input slab waveguide 30, an arrayed waveguide grating (AWG) 40, one output slab waveguide 50, and one or more output waveguides 60.

As shown in FIG. 1A, the input waveguides 20 are coupled to the input slab waveguide 30 via a parabolic waveguide horn or taper 80. Typically, the length of such a taper is between 150 μm and 1500 μm.

FIG. 1B depicts an expanded view of a parabolic waveguide horn or taper. The width of the taper is shown increasing gradually such that the width is largest at the input focal curve 90. In this example, the width of the taper as a function of the distance in the longitudinal direction is described by the parabolic function $$W^2=(z/L)(W_L^2-W_0^2)+W_0^2, \qquad (1)$$

where $W_L$ is the maximum width of the taper, $W_0$ is the minimum width of the taper, L is the length of the taper, z is the distance from the narrow end of the taper in the longitudinal direction, and W is the width of the taper at an arbitrary value of z. This shape of taper may be characterized as a parabolic taper.

Another taper design is shown in U.S. Pat. No. 6,069,990 to Okawa et al.

None of the above referenced designs, however, disclose an apparatus and method having a predetermined group velocity dispersion (GVD) as disclosed herein.

There is still a need for an optical apparatus that simultaneously broadens the passband and maintains low GVD.

There is also still a need for a useful method and apparatus incorporating a transitional segment as disclosed herein.

It is an aspect of the present invention to provide a method and apparatus that maintains the GVD within a predetermined range.

It is another aspect of the present invention to provide a method and apparatus to dynamically control the GVD in an optical apparatus.

It is still another aspect of the present invention to provide a method and apparatus to provide a controlled non-zero GVD in order to compensate for other non-zero GVD values introduced by other component.

Still other aspects and features of the present invention will become apparent in view of this disclosure.

SUMMARY OF THE INVENTION

The present invention is useful in optical communication systems. In particular, the present invention is capable of providing a selected group velocity dispersion of signals in wavelength division multiplexing systems.

The present invention optically couples a slab waveguide to at least one channel waveguide via a transition segment. The transition segment includes a taper and a taper extension. The taper has a narrow end and a wide end and the narrow end of the taper is configured to optically couple to said channel waveguide. The transition segment further includes an extension. The extension has a first end and a second end wherein the first end of the extension is configured to optically couple to the wide end of the taper and the second end of the extension is configured to optically couple to the slab waveguide and wherein the first end and the second end are equal in width.

One variation of the present invention is an optical apparatus which comprises at least one input waveguide, a first slab waveguide optically connected to the at least one input waveguide, a second slab waveguide optically connected to the first slab waveguide via an optical dispersive region, at least one output waveguide optically connected to the second slab waveguide, and at least one transition segment optically connecting the at least one input waveguide to the first slab waveguide wherein the at least one transition segment comprises a taper and an extension optically connecting a wide end of the taper to the first slab waveguide.

The present invention may include a plurality of transition segments and the transition segments may be positioned on the input side as described above, the output side of the device, or on both the input and the output side of the device. When a plurality of extensions are present, each transition segment may be identical or different. Properties such as width, length, curvature, angle, and material may be preselected.

The inventive transition segments may also include a heating element controlled by a programmable device such as a controller or computer. A feedback loop can be used to maintain a constant temperature at the extension. Alternatively, the transition segments may include an electro-element or an acousto-element.

In another variation of the present invention, the optical apparatus includes an arrayed waveguide grating. Alternatively, the optical apparatus may employ an integrated reflection grating.

In another variation of the present invention, the optical apparatus includes, in addition to one or more transition segments on the input side, at least one output taper optically connecting the at least one output waveguide to the second slab waveguide wherein the at least one output taper comprises a first end and a second end having a width wider than the first end and wherein the second end is optically connected to said slab waveguide. The width of the at least one output taper can be, but is not limited to, sufficiently narrow such that optical guiding is provided in only the fundamental mode; sufficiently wide such that optical guiding is provided for the third mode and coupling from the fundamental mode into the third mode is substantially negligible; parabolic shaped; or linear shaped. Alternatively, the output side may feature a constant width waveguide and no taper.

Another variation of the present invention includes a method for improving performance of an optical communication system. The method comprises establishing a value of GVD in an optical component of the optical communication system such that performance is improved. The value of GVD is established by providing an optical component comprising at least one transition segment configured to optically couple at least one channel waveguide to a slab waveguide. The transition segment comprises a taper having a narrow end and a wide end with the narrow end of the taper configured to optically couple to the channel waveguide. The transition segment further comprises an extension having a first end and a second end wherein the first end of the extension is configured to optically couple to the wide end of the taper and the second end of the extension is configured to optically couple to the slab waveguide. The first end and the second end having an equal width.

A variation of the inventive method includes providing said optical apparatus with a plurality of extensions each having a different length to provide a non-zero GVD which cancels a non-zero GVD introduced from another optical communication component.

Other variations of the present invention will become apparent in view of the foregoing text and referenced drawings.

DETAILED DESCRIPTION

The present invention is an apparatus useful in optical communication systems. The present invention may be, for example, a multiplexing router, a demultiplexing router, a N×N router (where N refers to the number of input and output waveguides), or a filter having only one input and one output waveguide. In particular, the present invention provides a novel transition segment or coupling between various structures (e.g., between a slab waveguide and a channel waveguide) found in optical routers based on an AWG or an integrated reflection grating. The transition segment can establish a predetermined value of GVD (e.g., a value approximately equal to zero) by influencing the optical field of light propagating through the optical apparatus. Consequently, performance of the optical communication system can be improved. The structure of the present invention as well as the theory upon which the present invention is believed to be based are provided below.

Figure 1A:
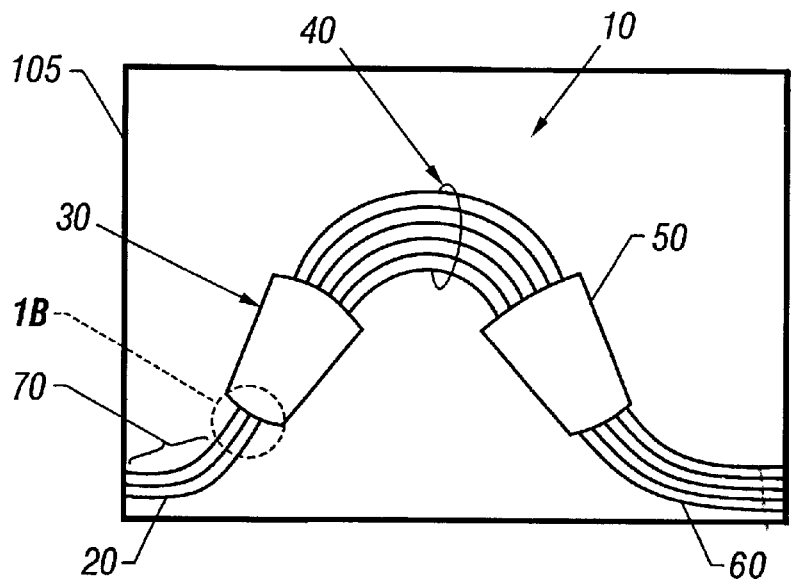
FIG. 1A is an illustration of a prior art PF-AWGR comprising parabolic input tapers.
Figure 1B:
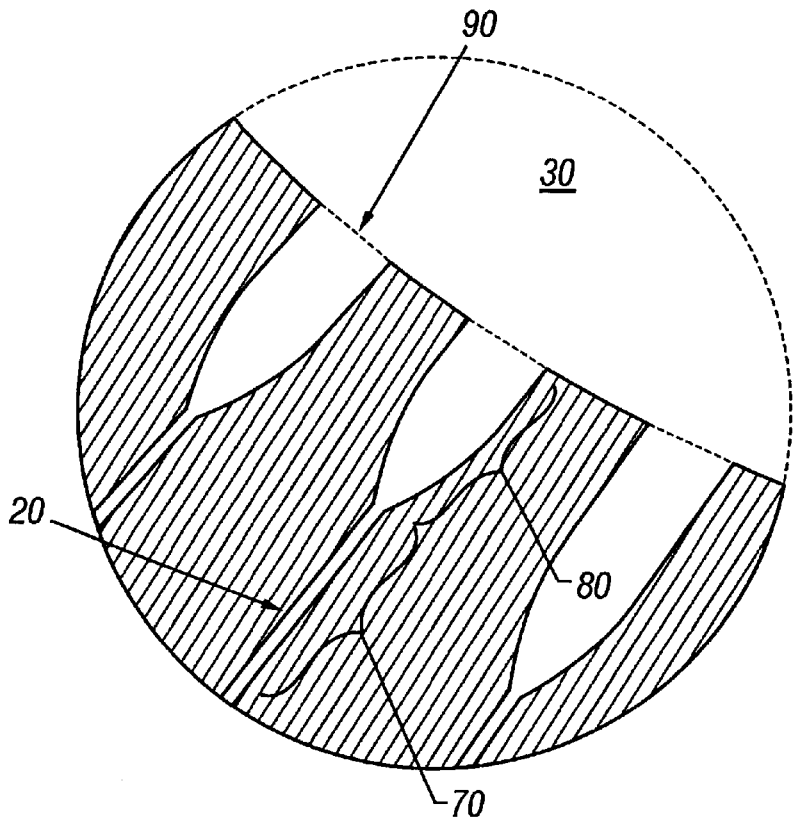
FIG. 1B is an expanded view of the input taper region shown in FIG. 1A.
Figure 2A:
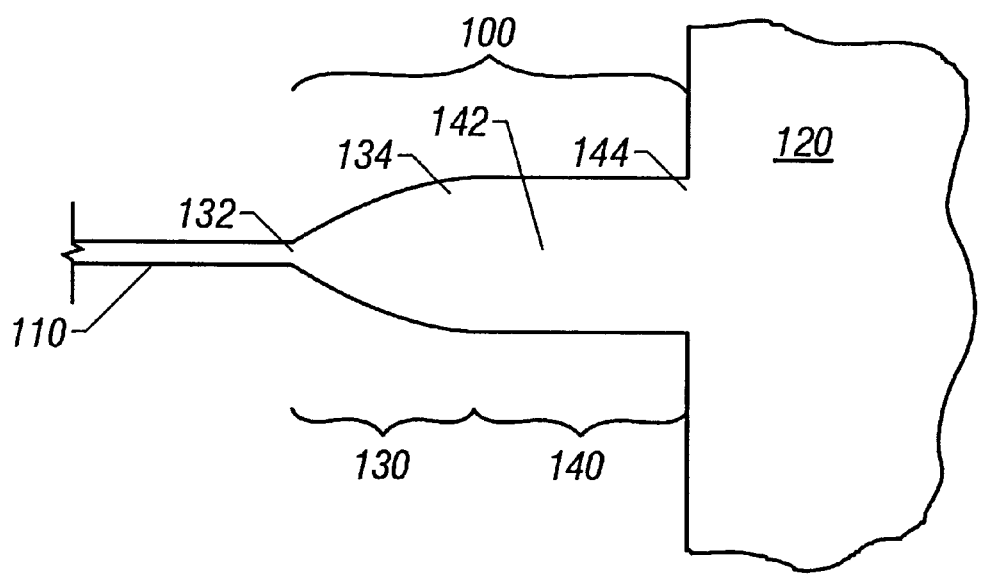
FIG. 2A is an illustration of a transition segment in accordance with the present invention.

An example of a transition segment 100 in accordance with the present invention is shown in FIG. 2A. The transition segment 100 of FIG. 2A provides optical coupling between channel waveguide 110 and slab waveguide 120. The inventive transition segment comprises a mode conversion structure or taper 130 having a narrow end 132 and a wide end 134, and a mode conserving structure or extension 140 having a first end 142 and a second end 144, such that the wide end of the taper is optically coupled to the first end of the taper extension. Preferably, the taper extension 140 has a substantially constant width. It is also preferable that while the taper 130 provides mode conversion, as discussed below, the taper extension 140 does not.

The transition segment 100 comprises a mode conversion structure such as taper 130. For example, the narrow end of the taper may comprise a channel waveguide that can support the $\phi_1$ mode, but cannot support the $\phi_3$ mode. The other end of the taper, or the wide end, may comprise a channel waveguide that can support the $\phi_1$ mode and can also support the $\phi_3$ mode. The size of the $\phi_1$ mode in the transverse direction is larger at the wide end than at the narrow end. Further, the taper may comprise an intermediate structure between the ends of the taper such that a field propagating into the taper at the narrow end in the $\phi_1$ mode couples adiabatically to a field at the wide end such that the field at the wide end is not entirely composed of the $\phi_1$ mode.

One preferred intermediate structure comprises a channel waveguide that has a width that increases smoothly from one end of the taper to the other end of the taper. For example, the taper may increase in width such that the width does not increase more than 2 μm per 1 μm of longitudinal distance.

Figure 2B:
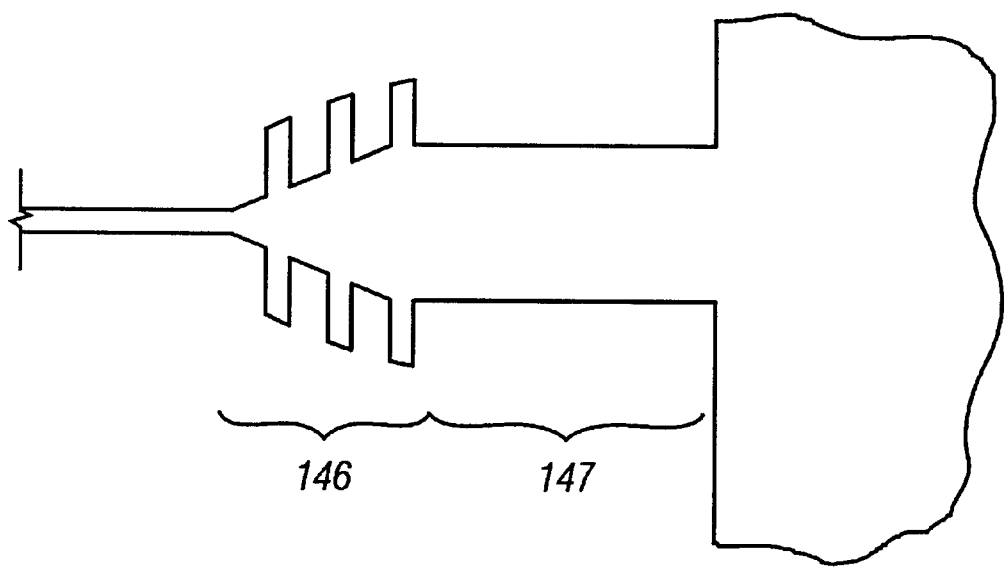
FIGS. 2B–2G are variations of the transition segment shown in FIG. 2A in accordance with the present invention.

Other types of intermediate structure, however, may be incorporated into the taper such as but not limited to dendritic tapers as disclosed in U.S. patent application No. 60/271,049, filed Feb. 23, 2001, entitled "DENDRITIC TAPER FOR AN INTEGRATED OPTICAL WAVELENGTH ROUTER" by Kenneth McGreer which is incorporated herein in its entirety. An example of a dendritic taper 146 is shown in FIG. 2B.

Figure 2C:
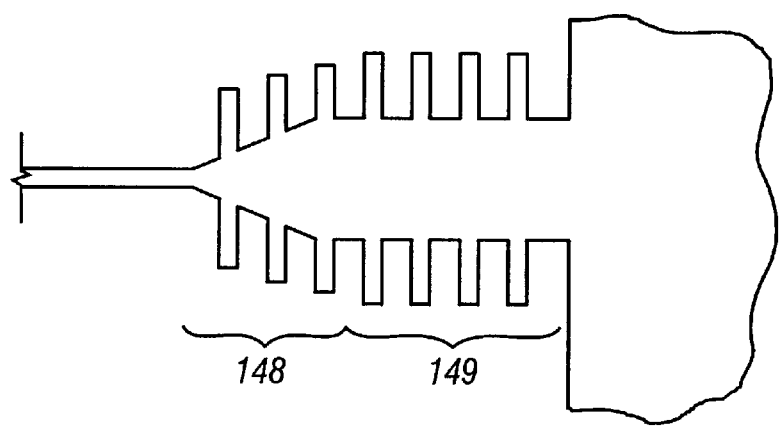
Figure 2D:
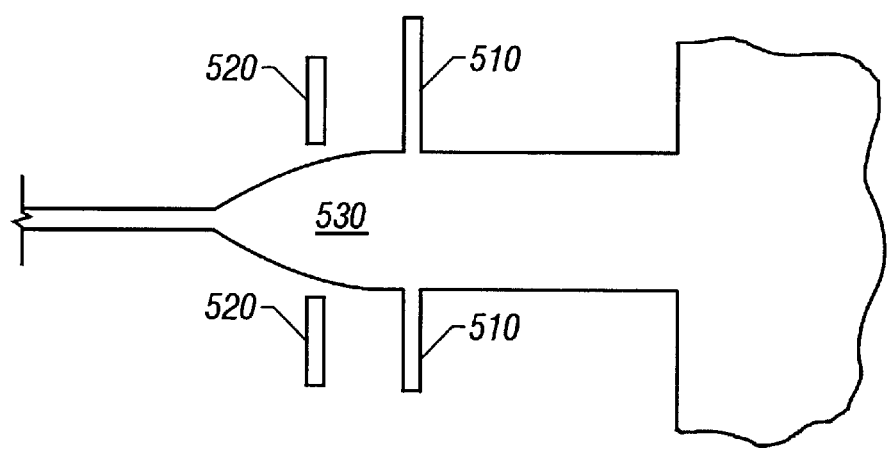
Figure 2E:
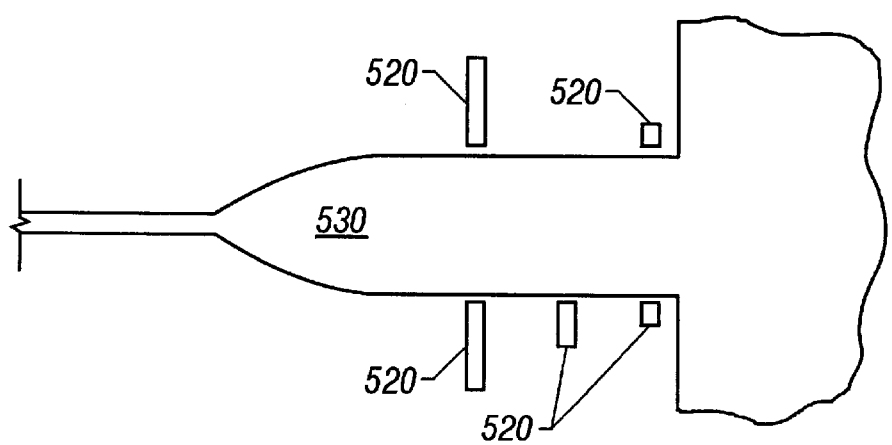

Still other variations in accordance with the present invention include the structures shown in FIGS. 2D and 2E. Referring to FIG. 2D, a mode conversion structure or taper is shown having additional branches 510 and 520. Branches 510 are continuous with taper region 530 whereas branches 520 are non-continuous with taper region 530. The branches may also be associated with mode conserving structure as shown in FIG. 2E. Branches preferably are less than 10 □m. in the longitudinal dimension.

Figure 2F:
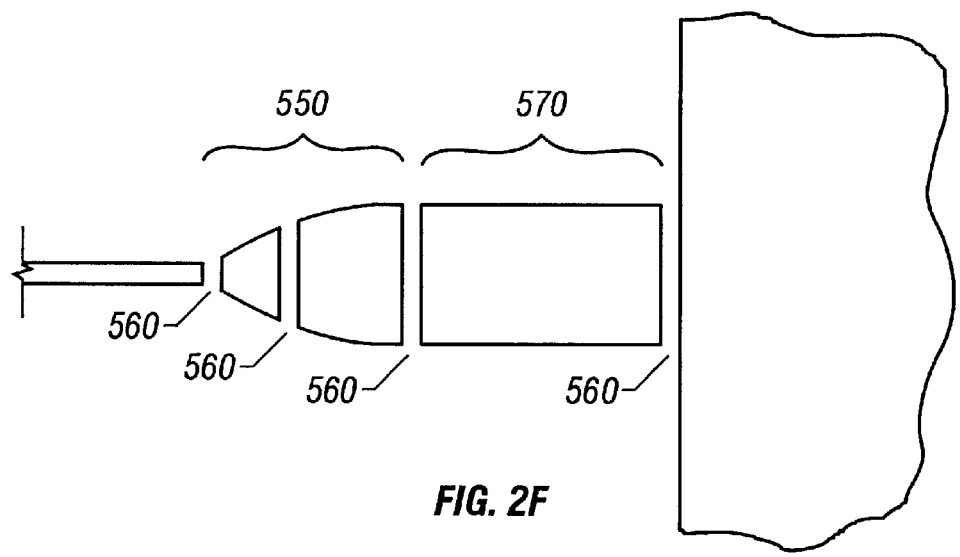
Figure 2G:
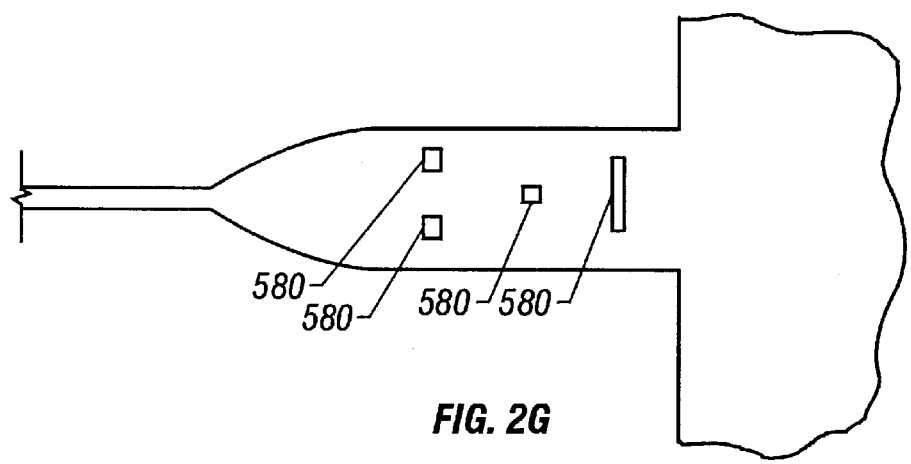

FIGS. 2F and 2G show yet other structures in accordance with the present invention. In FIG. 2F, for example, mode conversion structure (taper region 550) and mode conserving structure (extension 570) include discrete cladding-material regions 560. Cladding-material regions 560 separate the taper and extension regions into discrete sections of core material. Preferably, the discrete sections of core material are separated by less than 10 μm. The invention, however, is not so limited and other equivalents may used to carry out the present invention.

As shown in FIG. 2F, the discrete cladding-material regions 560 may extend the full width of the taper or extension. Alternatively, as shown in FIG. 2G, the discrete cladding-material regions 580 do not extend the full width of the taper or extension. A suitable width for a discrete cladding-material region may be less than 10 μm. That is to say, the discrete cladding-material region may extend for less than 10 μm. in the transverse direction. Likewise, a suitable length for the cladding-material is less than 10 μm. That is to say, the discrete cladding-material region may extend less than 10 μm. in the longitudinal direction. However, the cladding-material regions may have other dimensions.

Extensions may also have a number of shapes. As indicated above, the taper extension preferably has a substantially constant width throughout its length. However, the invention is not so limited and the taper extension may increase or decrease in width throughout the length of the taper extension. The increase or decrease in width may be linear, curved, or follow any other function which is appropriate for the application. Additionally, the taper extension may have other suitable geometry's such as the dendritic extension shown in FIG. 2C. Dendritic designs are disclosed in the above referenced patent application entitled "DENDRITIC TAPER FOR AN INTEGRATED OPTICAL WAVELENGTH ROUTER" by Kenneth McGreer.

The taper extensions of the present invention affect the optical field of light propagating through the transition segment. More specifically, use of a taper extension as disclosed herein allows the first mode on one side of the taper extension to remain substantially uncoupled to the third mode on the other side of the taper. Light that is coupled into the first mode at one end of the taper extension should propagate to the other end of the taper extension and therein couple to the first mode substantially more than it couples to the third mode. Light that is coupled into the third mode at one end of the taper extension should propagate to the other end of the taper extension and therein couple to the third mode substantially more than it couples to the first mode. The taper extension thus substantially prevents the first and third modes from coupling together, consequently improving performance of the optical apparatus. The taper extension thus acts as a mode conserving structure.

Figure 3A:
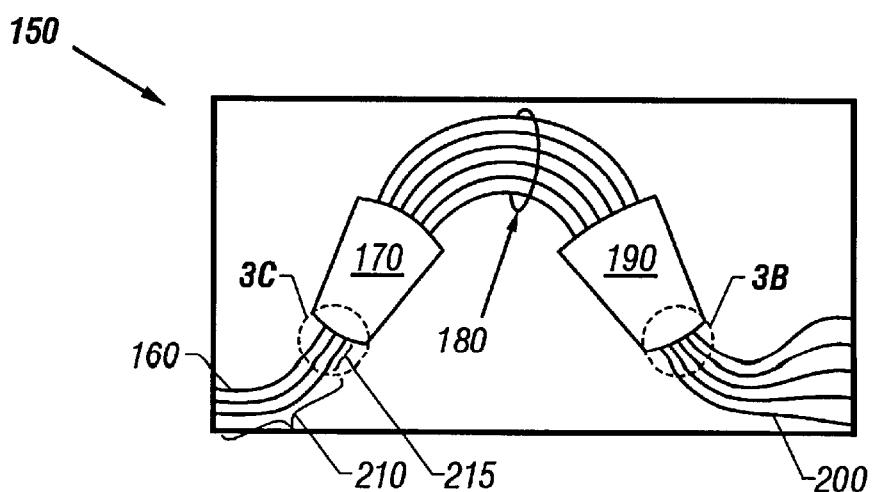
FIG. 3A is an illustration of a PF-AWGR in accordance with the present invention including tapers and extensions.

Various optical apparatuses may incorporate the transition segment as discussed above. FIG. 3A depicts a preferred PF-AWGR 150 in accordance with the present invention. Referring to FIG. 3A, the PF-AWGR 150 includes one or more input (or first) channel waveguides 160, an input (or first) slab waveguide 170, an arrayed waveguide grating (AWG) 180, an output (or second) slab waveguide 190, and one or more output (or second) channel waveguides 200.

FIG. 3A also illustrates a transition segment 215 which provides optical coupling between the slab waveguide and the channel waveguide on the input side, the output side, or both. The transition segment 215 is typically between 200 μm and 2500 μm in length.

In the PF-AWGR shown in FIG. 3A, the transition segments 215 are designed to provide a passband shape that is broader than a Gaussian passband shape and simultaneously maintain GVD within desirable limits.

Figure 3B:
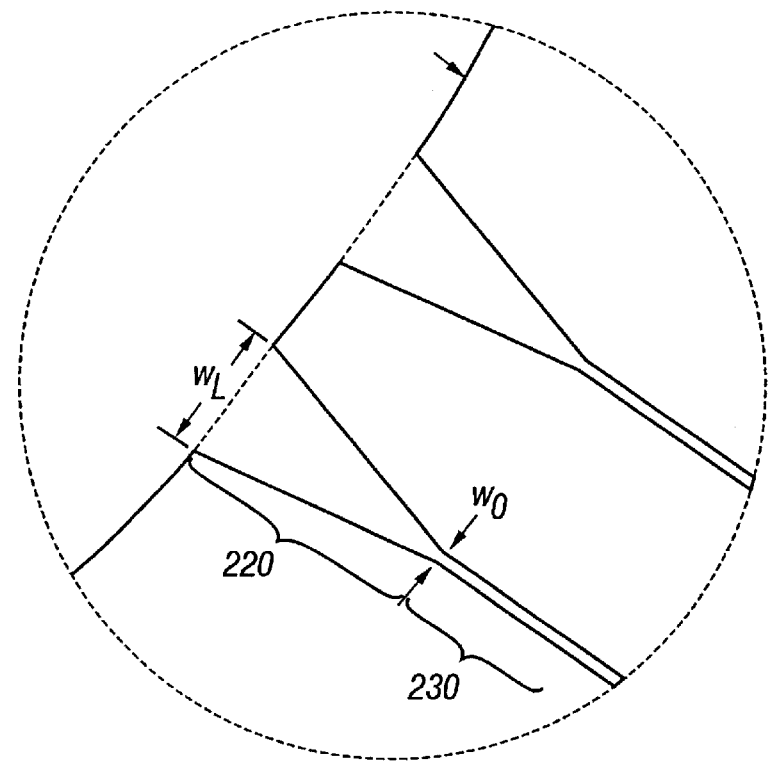
FIG. 3B is an expanded view of the optical coupling between the output waveguides and output slab waveguide of FIG. 3A.
Figure 3C:
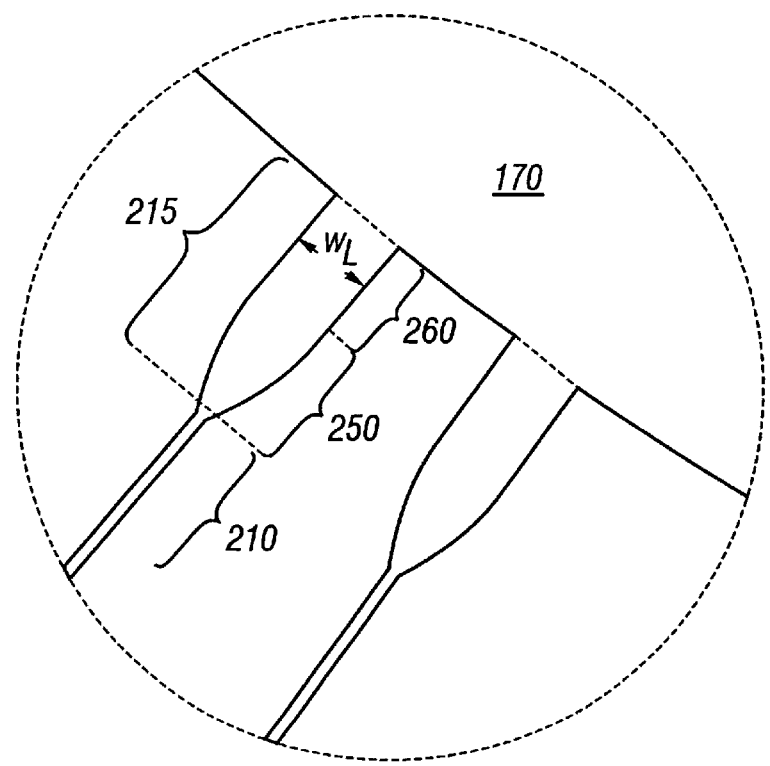
FIG. 3C is an expanded view of the transition region shown in FIG. 3A.

FIGS. 3B and 3C show expanded views of the optical coupling between the channel waveguides and the slab waveguides on the output and input sides respectively. For clarity, this invention is described with the inventive transition segment on the input side only. However, the invention is not so limited and transition segments may be incorporated on the output side of the AWGR, on both the input and output side, or any combination of the two sides. The present invention may also be used to multiplex or demultiplex signals.

As depicted in FIG. 3B, the output channel waveguide 230 is optically coupled to the output slab waveguide via a taper 220. Taper 220 may be a mode conversion taper or configured such that it does not support the third mode at the wide end. Taper 220 is shown as straight and having a width that increases from a value denoted as $W_0$ to a value denoted as $W_L$. The width has its largest value, $W_L$, at the point where the taper couples to the slab waveguide. The width has its smallest value, $W_0$, at the point where the taper couples to the channel waveguide 230. Furthermore, the width that the channel waveguide 230 has at the location where it is coupled to the taper also has a value equal to $W_0$.

In the preferred embodiment, the taper is designed so that if light were to propagate from the narrow end of the taper to the wide end of the taper it would remain substantially in the fundamental mode. In one variation of the preferred embodiment, $W_L$, the width of the taper at the point where it joins the slab waveguide, is sufficiently narrow so that it provides guiding for the fundamental optical mode but does not provide guiding for the third mode.

In another variation, $W_L$, the width of the taper at the point where it joins the slab waveguide, is sufficiently wide so that guiding is provided for the third mode but the taper is designed so that coupling from the fundamental mode into the third mode is substantially negligible.

The width of the taper as a function of the distance along the transition segment in the direction of optical propagation may be linear and described by the linear function $$W=(z/L)(W_L-W_0)+W_0$$

This taper is referred to as a linear taper. In another variation of the preferred embodiment, a parabolic taper is used and the width of the taper as a function of the distance along the transition segment in the direction of optical propagation is described by the parabolic function given in equation 1, shown above. In yet another variation of the preferred embodiment, the output channel waveguide is coupled directly to the output slab waveguide. That is, the output channel waveguide and the output slab waveguide are coupled without a taper.

As depicted in FIG. 3C, a transition segment 215 provides optical coupling between the input channel waveguide 210 and the input slab waveguide 170. The inventive transition segment 215 comprises a taper 250 and an extension 260. In FIG. 3C, the taper has a width that increases smoothly from a value denoted as $W_0$ to a value denoted as $W_L$. The width has its largest value, $W_L$, at the point where the transition segment couples to the slab waveguide 170. The width has its smallest value, $W_0$, at the point where the transition segment couples to the input channel waveguide 210. Furthermore, the width that the input channel waveguide 210 has at the location where it is coupled to the taper also has a value equal to $W_0$. A parabolic taper is preferred, i.e., the width of taper as a function of the distance along the taper in the direction of optical propagation is described by the parabolic function given in equation 1. However, the taper may also be linear. Further, the taper may comprise various intermediate structures such as those described above.

Also shown in FIG. 3B is an extension 260. Extension 260 may have a constant width. The width of the taper extension shown in FIG. 3B, $W_L$, equals the width that the taper segment has at the location where it is coupled to the taper extension. The taper extension is sufficiently wide to provide guiding for the third mode. In one variation of this embodiment, only one input waveguide is provided. In another variation of this embodiment, a plurality of input waveguides are provided, each with the same transition segment design, i.e., each with the same taper design and taper extension design. In another variation, a plurality of input waveguides are provided, each with a different transition segment design.

In operation, the optical field that propagates through the parabolic taper is converted from the fundamental mode into a multi-mode field so that the field at the point where the parabolic taper couples to another waveguide component is a multi-mode field. In order to achieve passband broadening, the width of the parabolic taper should be wide enough at the point where it couples to the other waveguide component to provide guiding for the third mode.

The transition segment design thus affects passband shape. To show this, let ϕ represent the normalized optical field at the input focal curve that would be generated if light propagated from the input channel waveguide to the input focal curve. Let ψ represent the normalized optical field at the output focal curve that would be generated if light propagated from the output channel waveguide to the output focal curve. Let F(λ) represent the field propagator associated with the propagation of light from the input focal curve to the output focal curve. Let R(λ) represent the field propagator associated with the propagation of light is the opposite direction, i.e., from the output focal curve to the input focal curve. The passband shape is determined by the spectral transmissivity. In the preferred embodiment, the field propagator associated with propagation from the input fiber to the input focal curve (denoted as "f") is substantially independent of the wavelength of light. Also, in the preferred embodiment, the field propagator associated with propagation from the output fiber to the output focal curve (denoted as "r") is substantially independent of the wavelength of light. Provided that f and r are independent of wavelength, the passband shape is determined by I, which is the spectral transmissivity between the input focal curve and the output focal curve. The fiber-to-fiber spectral transmissivity differs from I by a wavelength-independent factor that is associated with the fiber coupling loss and radiation loss in the transition segment. The spectral transmissivity depends on T, which is the transfer function associated with the propagation of light from the input focal curve to the output focal curve. The relationship between I and T is $$I=TT^*,$$

where $T^*$ is the complex conjugate of T. When light propagates from the input focal curve of the AWGR to the output focal curve of the AWGR, the transfer function is given by the inner product of $F(\lambda)\phi$ with ψ. When light propagates in the opposite direction, i.e., from the side of the AWGR previously referred to as the "output side" of the AWGR to the side of the AWGR previously referred to as the "input side" of the AWGR, the transfer function is given by the inner product of ϕ with $R(\lambda)\psi$. Because of the principle of reciprocity, the transfer function is independent of the direction of propagation of light and is given by $$T=<F(\lambda)\phi|\psi>=<\phi|R(\lambda)\psi>$$

where "$<y_1|y_2>$" represents the inner product operation of the functions $y_1$ and $y_2$. For the conventional AWGR, F and R preserve the shape of the field and only translate the field by a distance that increases substantially linearly with the wavelength of light comprising the optical field. In this case, $<F(\lambda)\phi|\psi>$ is the convolution of the fields $\phi$ and $\psi$. In the G-AWGR, both $\phi$ and $\psi$ are Gaussian, hence T is Gaussian, hence I is Gaussian.

In accordance with the present invention, passband broadening is provided by the parabolic taper on the input side of the AWGR such that $\phi$, the field at the input focal curve, has a bimodal shape rather than a Gaussian shape. In the preferred embodiment, $\psi$, the field at the output focal curve, is the fundamental mode of the output waveguide at the output focal curve.

The relationship between the imaginary contribution to T and GVD is given by $$GVD=(1/2\pi c)(d^2\Psi/d\sigma^2)$$

where $\sigma$ is the wavenumber, i.e., $\sigma=1/\lambda$, c is the speed of light in vacuum, and $\Psi$ is related to T according to $$\tan(\Psi)=Im(T)/Re(T).$$

From this relationship, it is apparent that GVD has a zero value throughout any portion of the passband for which T is independent of wavenumber. It is also apparent that T may be multiplied by a complex constant number of unity magnitude and arbitrary phase without affecting the values of I and GVD that are calculated from T. Because of this, in the analysis that follows, any two expressions for T are assumed to be equivalent if they differ only by a complex constant factor that has unity magnitude.

A more detailed description of passband broadening in the two-mode approximation may be developed by approximating the field in the transition segment as a linear combination of the first and third mode. Because the preferred embodiment comprises tapers that are symmetric about a plane that is perpendicular to the transverse direction and intersects the center of the taper, coupling into the second mode is negligible. Within the two-mode approximation, $\phi$ may be expressed as $$\phi=c_1\phi_1+c_3\phi_3 \quad (2)$$

where $\phi_i$ refers to the normalized field of the $i^{th}$ mode and $c_i$ refers to the coefficient related to the fraction of the power that is propagating in the $i^{th}$ mode. In general $c_1$ and $c_3$ may be complex, while $\phi_1$ and $\phi_3$ are required to be real functions. We adopt a convention such that $\phi_1$ has a local maximum near the center of the mode and $\phi_3$ has a local minimum near the center of the mode. These functions are sketched in FIG. 4. Without loss of generality, we require $c_1$ to be real. $c_3$ is real if the third mode is in phase with the first mode at the input focal curve. More generally, $c_3$ is real if and only if, the phase difference between the first and third modes is an integer multiple of $\pi$. In one embodiment of the present invention, one objective is for the taper extension to provide a value for $c_3$ that has an imaginary component that is as small as possible and, in particular, much smaller than the real component of $c_3$. In the prior art, the transition segment does not allow for easy control of the magnitude of the imaginary component of $c_3$ relative to the real component of $c_3$.

Obtaining a value for $c_3$ that has an imaginary component as small as possible is useful for the reasons discussed below. Within the two-mode approximation, the transfer function is given by $$T=c1<F(\lambda)\phi1|\psi>+c3<F(\lambda)\phi3|\psi>$$

Since the first term in the above expression is Gaussian, the passband deviation from a Gaussian is provided by the second term. That is, a non-zero value for $c_3$ is essential for passband broadening in the PF-AWGR. The real and imaginary components of the transfer function can be written explicitly as $$T=[a_1<F(\lambda)\phi1|\psi>+a_3<F(\lambda)\phi_3|>]+i[b_3<F(\lambda)\phi_3|\psi>]$$

where $c_1=a_1$, $$c_3=a_3+ib_3, \quad (3)$$

and $a_1$, $a_3$ and $b_3$ are real. Expressed another way $T=T_0+x+iy$ where $T_0=a_1<F(\lambda)\phi_1|\psi>$ \hfill (4a)

$x=a_3<F(\lambda)\phi_3|\psi>$ \hfill (4b)

$y=b_3<F(\lambda)\phi_3|\psi>$ \hfill (4c)

and $\tan(\Psi)=y/[x+T_0]$ \hfill (5a)

$GVD=(1/2\pi c)(d^2\Psi/d\sigma^2).$ \hfill (5b)

The wavelength dependence of $\Psi$ is attributed to the wavelength dependence of $F(\lambda)$. In the preferred embodiment, f, the aforementioned field propagator, is substantially independent of wavelength, hence $b_3$ is substantially independent of wavelength. The above equations indicate that, provided that $\Psi$ is sufficiently small so that $\tan(\Psi)$ is substantially a linear function of $\Psi$, GVD is substantially linearly proportional to $b_3$.

Hence an objective of low GVD can be met by ensuring that $b_3$ is as small as possible throughout the band associated with each wavelength channel.

The inventive extension can be used to provide a value of $b_3$ that is as small as possible. The extension has a first end and a second end. The first end is coupled to the taper and the second end is coupled to the slab waveguide at the focal curve. Since the extension has a constant width, the fields associated with the two modes of the extension, $\phi_1$ and $\phi_3$, will remain constant as the light propagates from one end of the extension to the other. $c_{10}$ and $c_{30}$ denote the coefficients of the linear combination of $\phi_1$ and $\phi_3$ that comprise the field at the first end of the taper extension, which are denoted as $\phi_0$, i.e.

$$\phi_0=c_{10}\phi_1+c_{30}\phi_3. \quad (6)$$

The field at the second end of the taper extension is given by $$\phi=c_{10}exp(i\beta_1L_e)\phi_1+c_{30}exp(i\beta_3L_e)\phi_3, \quad (7)$$

where $\beta_1$ and $\beta_3$ are the propagation constants of the first and third modes respectively and $L_e$ is the length of the extension. In general, the first and third modes will be out of phase at the first end of the taper extension. Combining equations 2, 3, 6 and 7 yields $$b_3 = a_1 A \sin((\beta_1 - \beta_3)L_e + \alpha), \quad (8)$$

where $A$ and $\alpha$ are defined according to $$A \exp(i\alpha) = c_{30}/c_{10}. \quad (9)$$

Therefore, in the two-mode design, the transfer function will have no imaginary component provided that the length of the extension is given by $$L_e = \alpha/.(\beta_1 - \beta_3) + n\pi. \quad (10)$$

where n is an integer. Values of $L_e$ associated with even values of n are preferred because they provide for wider passbands than values of $L_e$ associated with odd values of n. The effect of extensions that have even and odd values of n is shown in figures FIG. 4a and FIG. 4b respectively. The preferred value of $L_e$ is the smallest non-negative value satisfied by the above equation. $|c_{30}/c_{10}| = |c_3/c_1|$, i.e. the extension does not change the fraction of the optical power that is transported by the third mode. In this embodiment, there is a clear distinction between the role of the taper and the extension: the function of the taper is to transfer a suitable fraction of the total optical power from the first mode to the third mode, while the function of the extension is to adjust the relative phase between the third and first mode without affecting the relative power between the modes.

It should also be noted that, although the taper extension does not change $|c_3/c_1|$, it does change the transfer function T. This is because the transfer function depends on the relative phase of the third and first modes as well as the relative power in the two modes.

Figure 4A:
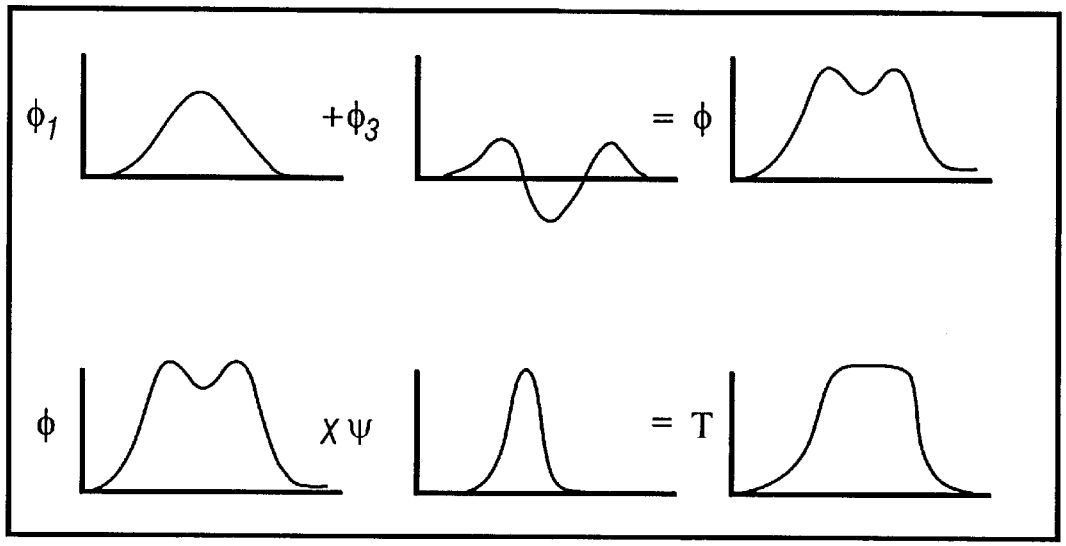
FIG. 4a is a graphical representation of $\phi_1$, $\phi_3$, $\phi$, $\psi$, and T when $\phi_1$, $\phi_3$ are in phase.
Figure 4B:
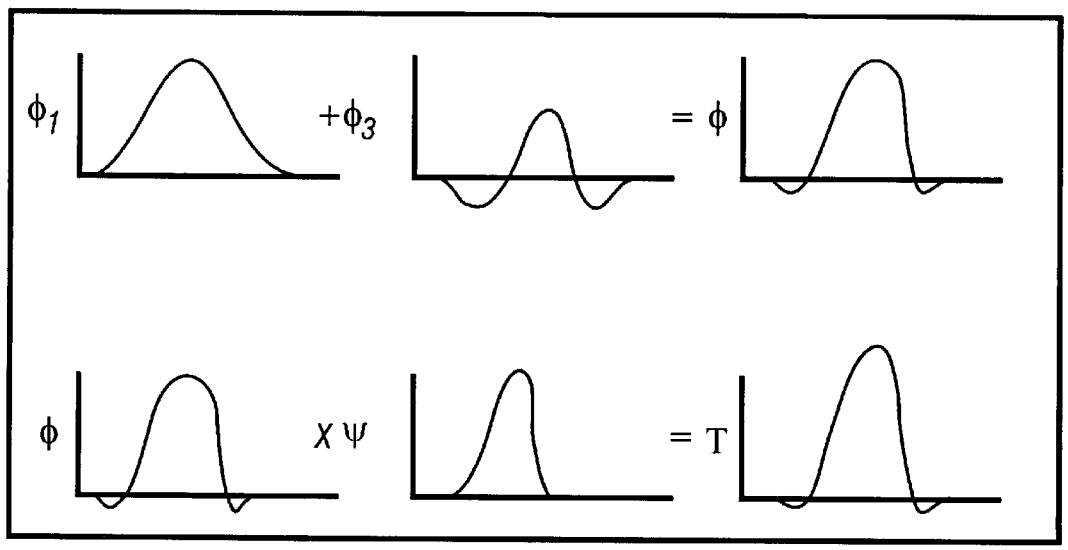
FIG. 4b is a graphical representation of $\phi_1$, $\phi_3$, $\phi$, $\psi$, and T when $\phi_1$, $\phi_3$ are out of phase by $\pi$.

Consequently, the extent of passband broadening is affected by the extension. One example of this is the change in passband associated with changing the phase of the third mode by $\pi$ relative to the phase of the first mode that is illustrated in FIG. 4a and FIG. 4b.

In one variation of this embodiment, the length of the extension is designed according to a method that provides for a value of $b_3$ such that $b_3$ is as close to zero as possible throughout the band associated with each wavelength channel. The method of this variation applies the two-mode approximation.

In a second variation of this embodiment, the length of the extension is designed according to a method that provides a field at the focal curve that is as flat as possible, i.e. the phase fronts of the field should be substantially planar and parallel to the focal curve at the point where the extension meets the slab waveguide. Beam propagation method is one technique that may be used as part of the design method to provide a design that will achieve planar phase fronts.

In a third variation of this embodiment, the length of the extension is designed according to experimental data and designed to provide a value of GVD that is within acceptable limits throughout the band associated with each wavelength channel while simultaneously providing a passband of suitable shape and width.

In a fourth variation of this embodiment, the extension is designed to minimize the variation GVD with the passband. For example, the extension may be designed to minimize the value of $|dGVD/d\lambda|$ within the passband. Alternatively, the extension may be designed to minimize the range of values of GVD within the passband.

In a fifth variation of this embodiment, the extension length is designed to provide the optimal passband width. Accordingly, the present invention provides a transition segment for coupling channel waveguides and slab waveguides such that GVD is predetermined and/or controlled.

As mentioned above, the width of the wide end of the taper and the extension may be equal. While the taper shape may increase in width according to a number of ratios, the taper preferably does not increase in width more than 2 $\mu$m per 1 $\mu$m in length (i.e., the taper does not increase in width at a rate greater than 2:1). Suitable ranges in width for the narrow end and wide end of the taper are between 5 $\mu$m–15 $\mu$m and 10 $\mu$m–50 $\mu$m respectively. A suitable range for the length of the taper is between 150 $\mu$m–500 $\mu$m and a suitable range for the length of the extension is greater than 10 $\mu$m.

Second Embodiment

In addition to the above described embodiment wherein $\phi$ (the optical field at the input focal curve) is multi-mode, both $\phi$ and $\psi$ may be multi-mode. The fields can be expressed in the two-mode approximation as $$\phi = c_1 \phi_1 + c_3 \phi_3,$$

and $$\psi = d_1 \psi_1 + d_3 \psi_3,$$

and the transfer function can be expressed as $$T = <F(\lambda)(c_1\phi_1 + c_3\phi_3)|(d_1\psi_1 + d_3\psi_3)>.$$

In one variation of this embodiment, coupling between the slab waveguide and the channel waveguides includes providing a transition segment on both the input side and the output side of the AWGR wherein each transition segment includes a taper extension to provide a flat field for $\phi$ and $\psi$. In a second variation of this embodiment, coupling between the slab waveguide and the channel waveguides includes providing the inventive transition segment on the input side but not on the output side of the AWGR. In this variation, the fact the $\psi$ does not have a flat field (in general) must be compensated for by providing $\phi$ with a phase that is not flat. In particular, $\phi$ must be of a particular combination of the first and third components that will provide T with no imaginary component. In a third variation, taper extensions are incorporated on both the input side and the output side and the lengths of the taper extensions are designed to provide T with no imaginary component even though the length of each taper extension does not provide a flat field for $\phi$ and $\psi$.

Third Embodiment

Figure 7:
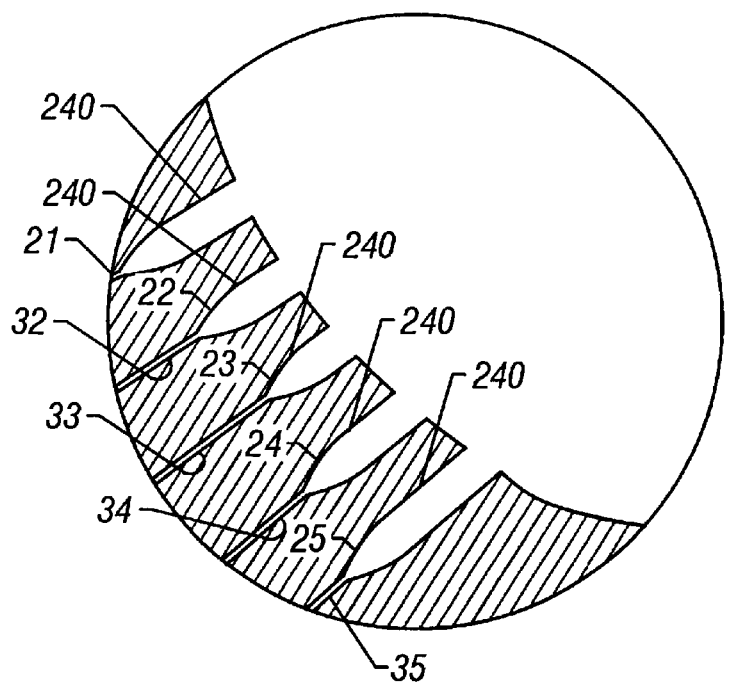
FIG. 7 is an illustration of a transition region comprising a plurality of taper extensions with different lengths.

FIG. 7 illustrates another variation of the present invention wherein the inventive transition segment provides coupling between the slab waveguide and the channel waveguides. The transition segments shown in FIG. 7 may be incorporated on the input side, the output side, or both sides of an AWGR. In FIG. 7, the lengths of the taper extensions are designed to provide a value of GVD that is different from zero. A non-zero value of GVD may be desirable when it can be used to cancel the effect of a non-zero value of GVD from another part of the optical communication system.

In one variation of this embodiment, the AWGR is designed as a demultiplexer and the inventive transition segment is applied to each of the output channel waveguides such that each taper extension 240 has a different length and compensates for a different value of GVD. In a second variation of this embodiment the AWGR is used as a multiplexer and the inventive transition segment is applied to each of the input channel waveguides such that each taper extension has a different length and compensates for a different value of GVD. Either of these variations could be used to compensate for the GVD arising from the optical fiber that is used to transport the optical signals. The GVD that arises from an optical fiber has a value that depends on the wavelength of the optical carrier that is used to transport the signal; therefore, an optical fiber may introduce a different amount of GVD for each channel in a multiplexing system. This embodiment could compensate for this GVD in each channel separately.

Fourth Embodiment

Figure 8:
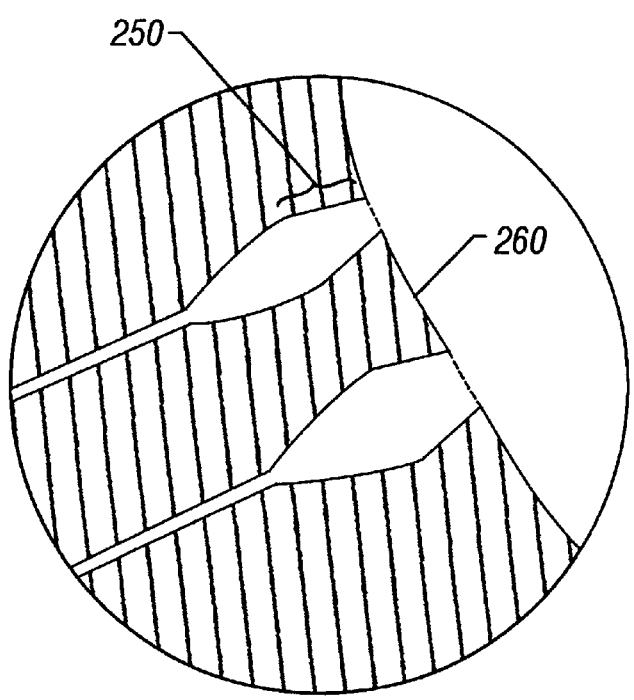
FIG. 8 is an illustration of a transition region comprising taper extensions having varying widths.

Depicted in FIG. 8 is a fourth embodiment of the present invention. In this embodiment, the taper extension 250 has a width that is not constant. However, the change in width of the taper extension is sufficiently gradual so as to proceed little mode conversion between the first and third modes as light propagates through the taper extension.

The variation depicted in FIG. 8 shows a taper extension 250 that narrows in width as it approaches the focal curve 260. In another variation, the taper extension increases in width as it approaches the focal curve. The width of the taper extension as a function of z, the distance in the longitudinal direction from one end of the taper extension, may follow a linear, a parabolic function, a sinusoidal function having several periods, a sinusoidal function having less than one period, or any other mathematical function. Because the change in width of the taper extension is sufficiently gradual, as the light travels through the taper extension of this embodiment, the optical power in the third mode relative to the optical power in the first mode does not substantially change.

Fifth embodiment

Another embodiment of the present invention (not illustrated) features a taper extension that exceeds the limits outlined in the above discussed embodiment. The optical power in this embodiment thus changes relative to the first mode as the light propagates through the taper extension.

In this embodiment, the taper extension can narrow in width as it approaches the focal curve. In another variation, the taper extension increases in width as it approaches the focal curve. The width of the taper extension as a function of z, the distance in the longitudinal direction from one end of the taper extension may follow a linear, a parabolic function, a sinusoidal function having several periods, a sinusoidal function having less than one period, or any other mathematical function. As the light travels through the taper extension of this embodiment, the optical power in the third mode relative to the optical power in the first mode changes. The taper extension must be designed so that the relative phase between the third and first modes comes out correctly (as in the first embodiment) and so that the change in relative power between the third and first modes is correct.

Sixth Embodiment

Figure 9A:
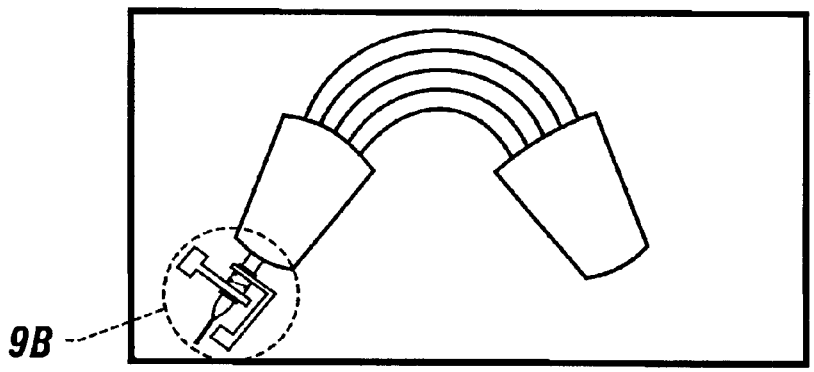
FIG. 9A is an illustration of a PF-AWGR with a heating element for controlling GVD.
Figure 9B:
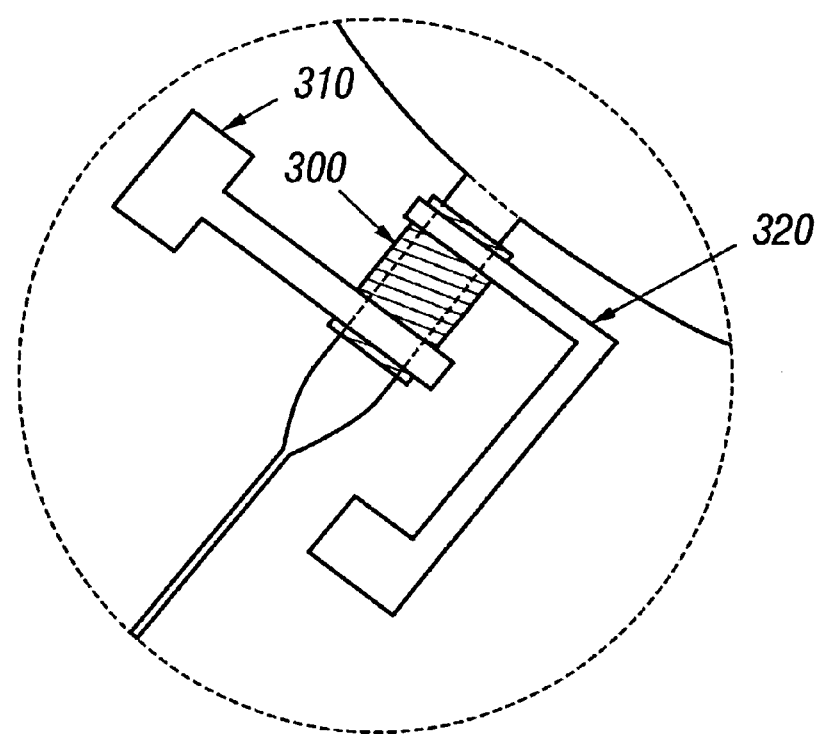
FIG. 9B is an expanded view of the transition region shown in FIG. 9A.

Depicted in FIGS. 9A and 9B is yet another embodiment of the present invention. This embodiment features a means of dynamically controlling the value of $(\beta_1-\beta_3)$ on at least one of the extensions. By controlling $(\beta_1-\beta_3)$, control of b3 is provided according to $$\Delta b_3 = a_1 A \cos((\beta_1-\beta_3)L_e+\alpha)L_e\Delta(\beta_1-\beta_3).$$

Furthermore, by controlling $\Delta b_3$, control is provided for GVD according to equations 4 and 5. Accordingly, a larger value of $L_e$ makes GVD more sensitive to the change in $\Delta(\beta_1-\beta_3)$. Large values of $L_e$ are thus preferred for this embodiment. Suitable values of $L_e$ may, for example, be between 1 mm and 10 mm. In one variation of this embodiment, the value of $(\beta_1-\beta_3)$ is controlled on an extension coupled to a single input waveguide and AWGR is used as a demultiplexer. In a second variation, the value of $(\beta_1-\beta_3)$ is controlled on each of the taper extensions of output channel waveguides that are used for an AWGR demultiplexer. In this second variation, the GVD can be dynamically adjusted for each optical channel individually. In a third variation, the value of $(\beta_1-\beta_3)$ is controlled on the taper extension of a single output waveguide that is used for an AWGR multiplexer. In a fourth variation, the value of $(\beta_1-\beta_3)$ is controlled on each of the taper extensions of input channel waveguides that are used for an AWGR multiplexer. In this variation, the GVD can be dynamically adjusted for each optical channel individually. The second and fourth of these variations could be applied to compensate for the GVD of an optical fiber, which has GVD with values that are not the same for each channel. Furthermore, the ability to dynamically adjust the value of GVD could be used to compensate for a change in the average GVD from the fiber as the length of a fiber in the system is changed or as other components with non-zero GVD are replaced.

Controlling $(\beta_1-\beta_3)$ may be carried out by a number of techniques. In one technique, a local heater is used to control $(\beta_1-\beta_3)$. The local heater typically comprises a heater strip 300 and two contact leads 310, 320. The heater strip comprises a strip of metal having a substantially non-zero resistance. Tungsten is one suitable metal for the heater strip. Chrome is another suitable metal for the heater strip. The width of the heater strip is typically 2 to 50 µm. A suitable range for the length of the heater strip is between 0.5 $L_e$ and 2 $L_e$, or between 0.5 and 20 mm.

Preferably, the heater strip is placed in contact with cladding material directly above the core material of the extension. The preferred contact leads comprise strips of metal having low electrical resistance and connect to metal pads suitable for wire bonding. The temperature of the extension is related to the value of the electrical current that is passed through the heater strip. The value of $(\beta_1-\beta_3)$ is related to the temperature of the extension. By controlling the electric current in the heater strip, the temperature of the extension can be adjusted to provide a desirable value of $(\beta_1-\beta_3)$. By adjusting $(\beta_1-\beta_3)$, the value of $b_3$ is adjusted and, thereby, the value of GVD is adjusted to a selected value.

Controlling the electric current may be accomplished as is known to those skilled in the art. For example, a programmable controller may be employed which delivers a specified current for a specified time. A computer may also be employed incorporating a feedback loop to maintain a specified current or measured temperature. Temperature measurement can be accomplished using a temperature sensor positioned at or near the heater. An example of a suitable temperature sensor is a thermistor. The temperature of the extension may therefore be adjusted to provide an optimum value of GVD.

In a second technique, the value of $(\beta_1-\beta_3)$ is adjusted by injecting charge carriers (i.e., either electrons or holes) into the layers of material that comprise the taper. This technique is suitable when the PLC comprises semiconductor layers that provide optical guiding such as layers of InGaAsP, for example.

In a third technique, the value of $(\beta_1-\beta_3)$ is adjusted using the electro-optic effect. The electro-optic effect is a change in the refractive index resulting from the application of a direct current of low-frequency electric field. Examples of the electro-optic effect include but are not limited to the Pockels effect in lithium niobate and the quantum confined stark effect in InP-based quantum well devices. This technique is suitable when the PLC comprises semiconductor layers that provide optical guiding or when the PLC comprises layers that have a high electro-optic coefficient, such as layers of lithium-niobate, for example.

This embodiment may also be used to control DGD since, as discussed above, changing GVD typically results in changing DGD.

Seventh Embodiment

Figure 10:
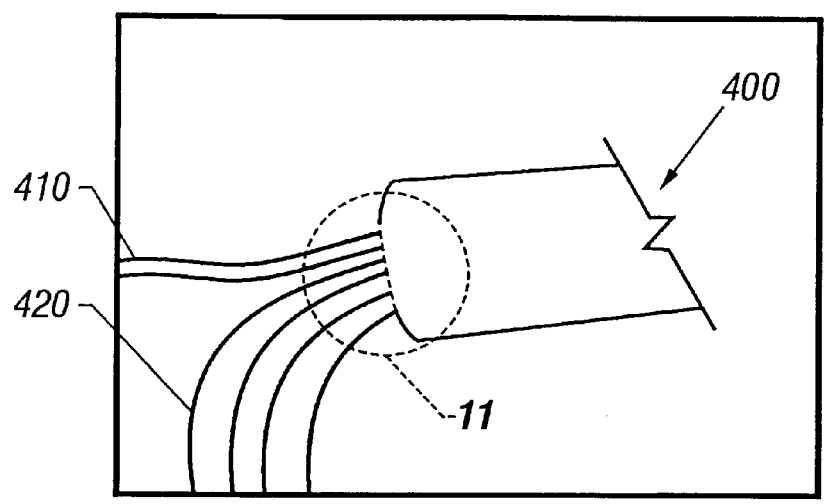
FIG. 10 is an illustration of a variation of the present invention having an integrated reflection grating.

FIG. 10 illustrates another embodiment of the present invention. In FIG. 10, an integrated reflection grating 400 is optically coupled to input channel waveguides 410 and output channel waveguides 420. The integrated reflection grating is in accordance with those known in the art.

Figure 11:
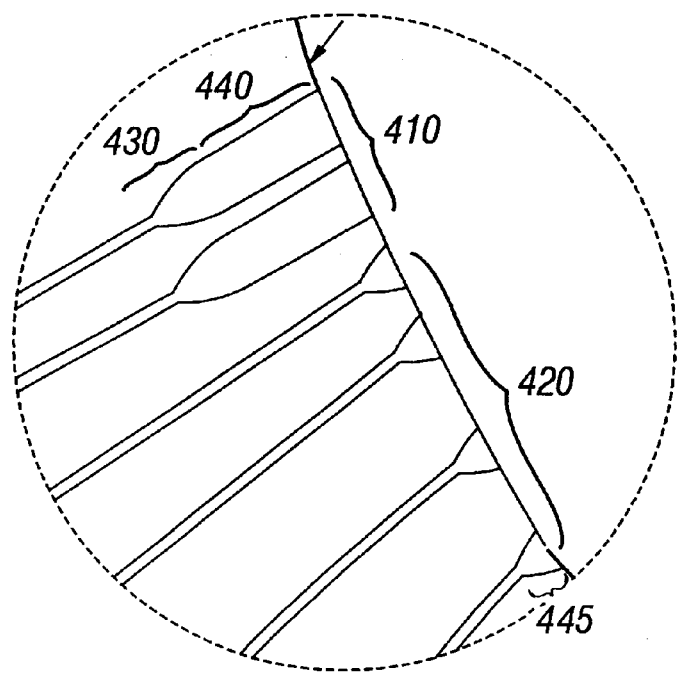
FIG. 11 is an expanded view of the focal curve region of FIG. 10.

FIG. 11 illustrates an expanded view of the input and output channel waveguides. FIG. 11 also illustrates a transition segment. Similar to the above discussed embodiments, the transition segment features a taper 430 and a taper extension 440. This transition segment may be disposed between the input and/or output channel waveguides and the slab waveguide.

Other modifications in accordance with the present invention may be carried out in the embodiment shown in FIGS. 10–11 without departing from the scope of the invention. Such modifications include but are not limited to adding extensions to connect the output channel tapers 445, adding metallic strips to the extensions 440, and using the optical router as a multiplexer or demultiplexer.

EXAMPLES

To demonstrate the effectiveness of the invention, we designed, fabricated and tested several PF-AWGRs ("test devices") which included transition segments in accordance with the present invention.

The test devices included input tapers having parabolic shapes. The test devices also featured taper extensions having lengths ranging from 0 $\mu$m to 280 $\mu$m.

Three linear output taper designs were tested. One output taper design was 16 $\mu$m wide at the focal curve and 900 $\mu$m long; a second output taper design was 14 $\mu$m wide at the focal curve and 700 $\mu$m long; a third output taper design was 12 $\mu$m wide at the focal curve and 500 $\mu$m long. None of the output tapers had a taper extension. The GVD was measured for each of these designs.

Figure 5:
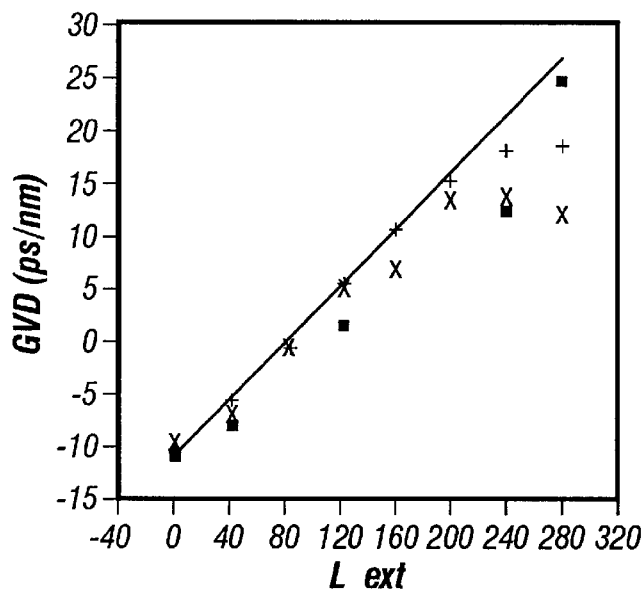
FIG. 5 is a chart illustrating GVD vs. $L_e$ based on experimental data.

The data is illustrated in FIG. 5. In FIG. 5, the square symbols represent data with outputs tapers having a maximum width of 12 $\mu$m; the '+' symbols represent data with outputs tapers having a maximum width of 14 $\mu$m; the 'x' symbols represent data with outputs tapers having a maximum width of 16 $\mu$m. The data for low values of taper extension follow the function: GVD (in ps/nm)=–11.0+ 0.135 $L_e$/$\mu$m. GVD is zero for a taper extension of approximately 80 $\mu$m.

These data illustrate that the GVD varies linearly with the length of the taper extension provided that the taper extension is not longer than 200 $\mu$m. This is consistent with the theory discussed above for the region where tan($\Psi$) is linear. Furthermore, the GVD does not substantially vary with the output taper design because $\psi$ (the field at the focal curve of the output taper) is still substantially the fundamental mode. Each device comprising the aforementioned output tapers is an example of the variation in which the output taper does provide guiding for the third mode, but the taper is designed so the coupling into the third mode is negligible. According to the experimental data illustrated in FIG. 5, the lowest GVD for the device used in this example is provided by a taper extension length of approximately 80 $\mu$m.

Figures 6A, 6B, 6C:
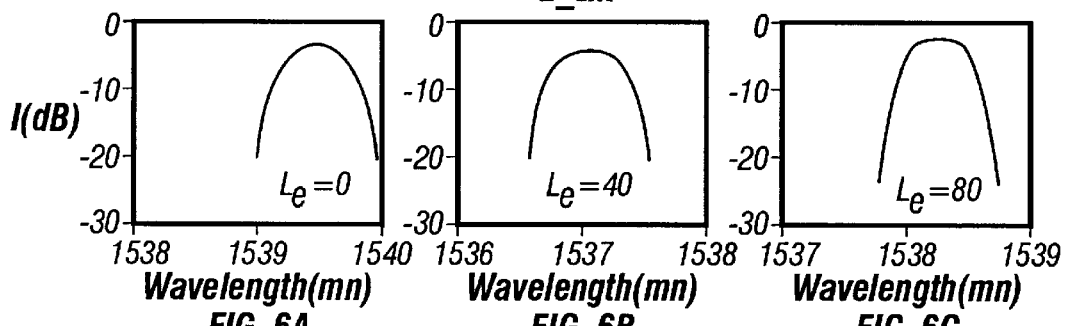
FIG. 6 is a chart illustrating passband dependence on $L_e$ based on experimental data.
Figures 6D, 6E, 6F:
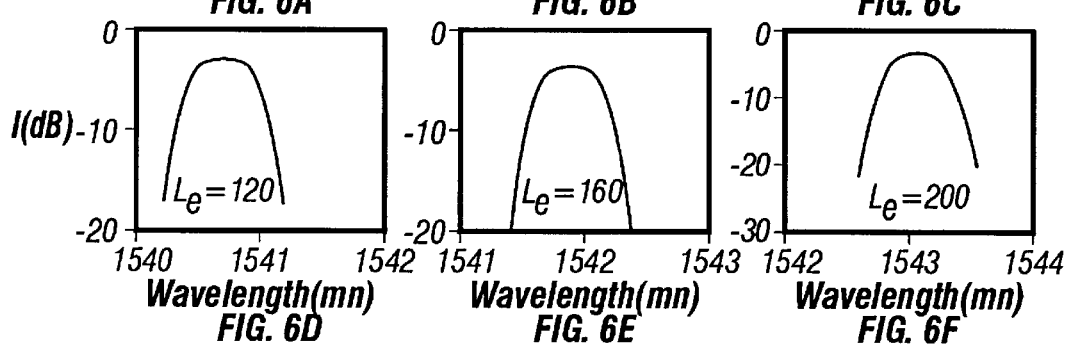
Figures 6G, 6H:
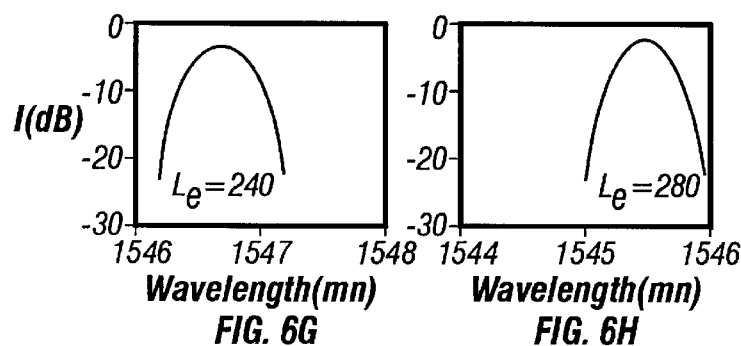

FIG. 6 illustrates that the passband shape is also affected to some extent by the length of the taper extension. In FIG. 6, the passbands (or spectral transmissivities I) for eight different taper extension lengths are shown. The length of the taper extension is shown on the inset of each plot. For the PF-AWGR design used here, the passband is flattest for a taper extension length of approximately 80 $\mu$m.

Thus, in this example, the optimal passband flatness occurs simultaneously with the lowest GVD. The experimental data is qualitatively consistent with our simulations based on the two-mode approximation. The AWGR in this example was evaluated for insertion loss, adjacent isolation, nonadjacent isolation, passband ripple, and polarization dependent loss and the passband width at the reference levels of –0.5 dB, –1 dB and –3 dB. In all these categories, the performance remained the same or improved when the taper extension was used.

While particular embodiments and variations of the present invention have been described, other modifications apparent to those of ordinary skill in the art are considered part of the present invention and are intended to be covered by the present invention as defined by the following claims.

What is claimed is:

1. An optical apparatus comprising:
at least one transition segment configured to optically couple at least one waveguide to a slab waveguide, said at least one transition segment comprising a taper having a narrow end and a wide end, said narrow end of said taper configured to optically couple to said at least one waveguide, said transition segment further comprising an extension having a first end and a second end wherein said first end of said extension is configured to optically couple to said wide end of said taper and said second end of said extension is configured to optically couple to said slab waveguide wherein said first end has a first end width and said second end has a second end width equal to said first end width wherein at least one of the taper and the extension comprises a core material and a cladding material, said cladding material separating the core material into at least two discrete core-material sections and wherein at least one of said discrete core-material sections has a width different than another of said discrete sections and wherein the extension is a channel waveguide substantially constant in width and wherein the wide end of the taper and the extension are equal in width and wherein the taper increases in width not more than 2 $\mu$m per 1 $\mu$m in length and wherein the extension further comprises an element selected from the group consisting of: a thermo-optic element, an electro-optic element, and an acousto-optic element.

2. The optical apparatus according to claim 1 wherein the length of the extension is between 40 and 120 $\mu$m.

3. The optical apparatus according to claim 2 wherein the length of the extension is about 80 $\mu$m.

4. An optical apparatus comprising:
at least one transition segment configured to optically couple at least one waveguide to a slab waveguide, said transition segment comprising
a mode conversion structure comprising a narrow end and a wide end, said mode conversion structure configured to substantially couple a first mode at the narrow end and an optical field at the wide end, said optical field comprising a component in the first mode and a component in the third mode, and an extension comprising a first end and a second end and an intermediate mode conserving structure therebetween, said intermediate mode conserving structure configured to substantially couple the first mode at said first end and the first mode at said second end, to substantially couple the third mode at said first end and the third mode at said second end, to prevent substantial coupling between the first mode at said first end and the third mode at the said second end, and to prevent substantial coupling between the third mode at said first end and the first mode at said second end, wherein the mode conserving structure has a length that provides said optical field at said second end with phase fronts that are substantially flat.

5. The optical apparatus according to claim 4 wherein said mode conversion structure is further configured such that optical power propagating in said optical field at said wide end of said taper is substantially equal to the optical power propagating in the first mode at said narrow end.

6. The optical apparatus according to any one of claims 4 and 5 wherein the mode conserving structure has a curve.

7. The optical apparatus of any one of claims 4 and 5 wherein at least one of the mode conversion structure and the mode conserving structure comprises a core material and a cladding material, said cladding material separating the core material into at least two discrete core-material sections.

8. The optical apparatus of claim 7 wherein the at least two discrete core-material sections are separated by less than 10 μm.

9. The optical apparatus according to any one of claims 4 and 5 wherein the mode conversion structure comprises a dendritic taper.

10. The optical apparatus according to any one of claims 4 and 5 wherein the extension further comprises an element selected from the group consisting of: a thermo-optic element, an electro-optic element, and an acousto-optic element.

11. The optical apparatus of claim 10 wherein said extension comprises a thermo-optic element.

12. The optical apparatus of claim 11 wherein said thermo-optic element comprises a metal strip that affects the temperature of the extension when a voltage is applied across the metal strip.

13. A router comprising:
a first slab waveguide;
a second slab waveguide optically coupled to said first slab waveguide via an arrayed waveguide grating;
at least one waveguide optically coupled to said second slab waveguide; and
at least one waveguide optically coupled to said first slab waveguide via an optical apparatus as recited in any one of claims 4–12.

14. The optical apparatus according to claim 13 wherein said extension has a length that provides said router with a transfer function that has no imaginary component throughout a passband associated with each wavelength channel.

15. The optical apparatus according to claim 13 wherein said extension has a length that provides said router with a minimum variation of the value of GVD within a passband of an associated wavelength channel.

16. A router comprising:
a slab waveguide comprising an integrated reflection grating; and
at least one waveguide optically coupled to said slab waveguide via an optical apparatus according to any one of claims 4–12.

17. The router according to claim 16 wherein the at least one extension has a length that provides said router with a transfer function that has no imaginary component throughout a passband associated with each wavelength channel.

18. The router according to claim 16 wherein said extension has a length that provides the router with a predetermined mean value of GVD within a passband of an associated wavelength channel.

19. The router according to claim 18 wherein the predetermined mean value of GVD is zero.

20. The router according to claim 16 wherein the extension has a length that provides said router with a minimum variation of a value of GVD within a passband of an associated wavelength channel.

21. The optical apparatus of any one of claims 4 and 5 wherein said at least one of said mode conversion structure and said mode conserving structure further comprises at least one branch.

22. The optical apparatus of claim 21 wherein said at least one branch is continuous with said at least one mode conversion structure and said mode conserving structure.

23. The optical apparatus of claim 22 wherein said at least one branch is not continuous with said at least one mode conversion structure and said mode conserving structure.

24. An optical apparatus comprising:
a slab waveguide; and
a plurality of channel waveguides optically coupled to said slab waveguide, each of said plurality of channel waveguides optically coupled to said slab waveguide via a transition segment, said transition segment comprising:
a taper comprising a narrow end and a wide end and increasing not more than 2 μm in width per 1 μm in length, wherein said narrow end of said taper is configured to optically couple to said channel waveguide, and said transition segment further comprising an extension comprising a first end, a second end, and a constant width wherein said first end of said extension is configured to optically couple to said wide end of said taper and said second end of said extension is configured to optically couple to said slab waveguide and wherein said extension is equal in width to said wide end of said taper
wherein each extension further comprises an element selected from the group consisting of: a thermo-optic element, an electro-optic element, and an acousto-optic element.

25. The optical apparatus according to claim 14 wherein each extension has a length substantially equal to an average of the lengths of said plurality of extensions.

26. The optical apparatus according to claim 14 wherein at least one extension has a length which is substantially unequal to an average of the lengths of said plurality of extensions.

27. The optical apparatus according to claim 26 wherein each extension further comprises a thermo-optic element.

28. The optical apparatus according to claim 27 wherein said thermo-optic element comprises a metal strip that affects the temperature of the extension when a voltage is applied across the metal strip.

29. An optical apparatus comprising:
a slab waveguide; and
a plurality of channel waveguides optically coupled to said slab waveguide, each of said channel waveguides coupled to said slab waveguide via a transition segment, each said transition segment comprising
a taper comprising a narrow end and a wide end and an intermediate mode conversion structure therebetween, said intermediate mode conversion structure configured to substantially couple a first mode at the narrow end and an optical field at the wide end wherein said optical field comprises a component in the first mode and a component in a third mode, said taper further configured such that optical power propagating in said optical field at said wide end is substantially equal to optical power propagating in said first mode at said narrow end, and said transition segment further comprising an extension comprising a first end and a second end and an intermediate mode conserving structure therebetween, said intermediate mode conserving structure configured to substantially couple the first mode at said first end and the first mode at said second end, to substantially couple the third mode at said first end and the third mode at said second end, to prevent substantial coupling between the first mode at said first end and the third mode at the said second end, and to prevent substantial coupling between the third mode at said first end and the first mode at said second end wherein each extension further comprises an element selected from the group consisting of: a thermo-optic element, an electro-optic element, and an acousto-optic element.

30. The optical apparatus according to claim 29 wherein each extension has a length that is substantially equal to an average of the lengths of said plurality of extensions.

31. The optical apparatus according to claim 29 wherein at least one extension has a length substantially unequal to an average of the lengths of said plurality of extensions.

32. The optical apparatus according to claim 30 wherein each extension further comprises a thermo-optic element.

33. The optical apparatus according to claim 32 wherein said thermo-optic element comprises a metal strip that affects the temperature of the extension when a voltage is applied across the metal strip.

34. A router comprising:
a first slab waveguide;
a plurality of waveguides coupled to said first slab waveguide via an optical apparatus as recited in any one of claims 24 to 33;
a second slab waveguide optically coupled to said first slab waveguide via an arrayed waveguide grating; and
at least one waveguide optically coupled to said second slab waveguide.

35. The router of claim 34 wherein the plurality of waveguides are coupled to said first slab waveguide via an optical apparatus as recited in claim 26.

36. The router of claim 35 wherein said extension has a length that provides a predetermined mean value of GVD within a passband associated with each taper extension.

37. A router comprising:
a first slab waveguide;
a second slab waveguide optically coupled to said first slab waveguide via an arrayed waveguide grating;
at least one waveguide optically coupled to said second slab waveguide; and
at least one waveguide optically coupled to said first slab waveguide via an optical apparatus, said optical apparatus comprising at least one transition segment configured to optically couple at least one waveguide to a slab waveguide, said at least one transition segment comprising a taper having a narrow end and a wide end, said narrow end of said taper configured to optically couple to said at least one waveguide, said transition segment further comprising an extension having a first end and a second end wherein said first end of said extension is configured to optically couple to said wide end of said taper and said second end of said extension is configured to optically couple to said slab waveguide wherein said first end has a first end width and said second end has a second end width equal to said first end width and wherein said extension has a length that provides said router with a predetermined mean value of GVD within a passband of an associated wavelength channel.

38. The router of claim 37 wherein the predetermined mean value of GVD is zero.

39. An optical apparatus comprising:
at least one transition segment configured to optically couple at least one waveguide to a slab waveguide, said transition segment comprising
a mode conversion structure comprising a narrow end and a wide end, said mode conversion structure configured to substantially couple a first mode at the narrow end and an optical field at the wide end, said optical field comprising a component in the first mode and a component in the third mode, and
an extension comprising a first end and a second end and an intermediate mode conserving structure therebetween, said intermediate mode conserving structure configured to substantially couple the first mode at said first end and the first mode at said second end, to substantially couple the third mode at said first end and the third mode at said second end, to prevent substantial coupling between the first mode at said first end and the third mode at the said second end, and to prevent substantial coupling between the third mode at said first end and the first mode at said second end wherein said at least one of the mode conversion structure and the mode conserving structure comprises at least one discrete region of cladding material.

40. The optical apparatus of claim 39 wherein said at least one discrete region of cladding material is less than 10 $\mu$m in a longitudinal direction.

41. The optical apparatus of claim 40 wherein said at least one discrete region of cladding material is less than 10 $\mu$m in a transverse direction.

* * * * *